Figure 1:
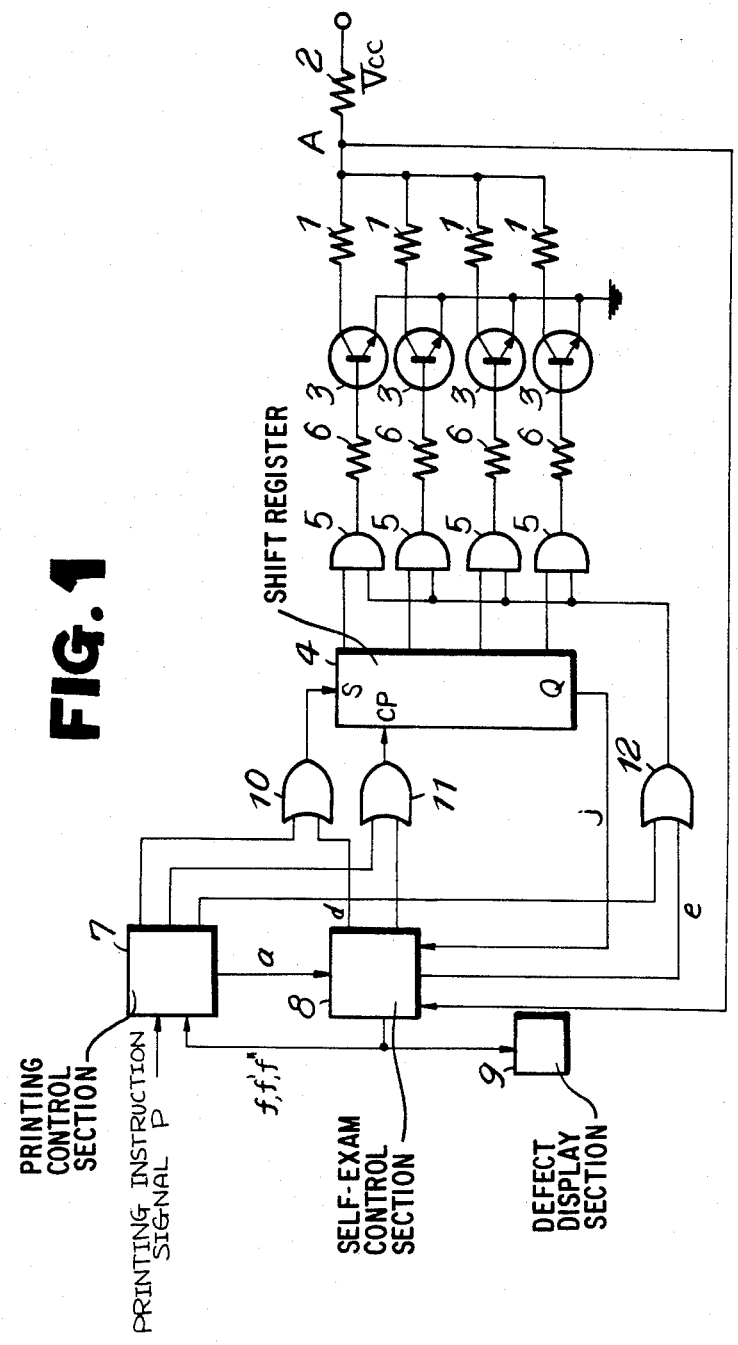

United States Patent [19]

Kawaguchi

[11] Patent Number: 4,519,075
[45] Date of Patent: May 21, 1985

[54] DEVICE FOR CHECKING THE PRINTING CIRCUIT OF A THERMAL PRINTER

[75] Inventor: Hatsuo Kawaguchi, Kurita, Japan

[73] Assignee: Kabushiki Kaisha Ishida Koki Seisakusho, Kyoto, Japan

[21] Appl. No.: 407,327

[22] Filed: Aug. 12, 1982

[30] Foreign Application Priority Data

Aug. 12, 1981 [JP] Japan .................................. 56-127144

[51] Int. Cl.$^3$ ............................................. G06F 11/00
[52] U.S. Cl. ........................................ 371/15; 364/551
[58] Field of Search .................. 371/15; 364/550, 551

[56] References Cited

U.S. PATENT DOCUMENTS

| | | | |
|---|---|---|---|
| 3,665,399 | 5/1972 | Zehr et al. ........................ | 364/551 X |
| 4,396,990 | 8/1983 | Weingartner et al. ......... | 364/551 X |
| 4,402,054 | 8/1983 | Osborne et al. ................. | 364/551 X |
| 4,412,328 | 10/1983 | Homa ................................. | 371/15 X |

*Primary Examiner*—Jerry Smith
*Assistant Examiner*—Mark Ungerman
*Attorney, Agent, or Firm*—Armstrong, Nikaido, Marmelstein & Kubovcik

[57] ABSTRACT

A device for checking the printing circuit of a thermal printer wherein pulse currents are passed through only those of the heaters which correspond to printing data stored in a shift register via a power supply resistor and driver transistors to energize the corresponding heaters so as to effect color printing for one operation on heat-sensitive paper. The device comprises a self-examination control section for effecting at least one of the three types of checking, i.e., a check on the driver transistors for malfunction, a check on the heaters for malfunction, and a check on the shift register for malfunction, the arrangement being such that the printing circuit is automatically checked without actual printing operation by making use of the waiting time in which the thermal printer is not printing.

Checking the printing circuit by the present device avoids delay in printing and dispenses with manual operation for checking. Thus, it increases the reliability of the thermal printer and avoids wasting heat-sensitive paper and heat-sensitive labels for checking.

8 Claims, 2 Drawing Figures

DEVICE FOR CHECKING THE PRINTING CIRCUIT OF A THERMAL PRINTER

This invention relates to a device for judging whether or not the printing circuit of a thermal printer is operating normally, and also to a thermal printer is equipped with such a device. More particularly, the invention relates to a device for self-examining the printing circuit of a thermal printer during the non-printing time to judge whether or not the various parts of the printing circuit are in good condition.

Generally, the printing circuit of a thermal printer is constituted of a thermal print head in which a plurality of heaters are arranged, for example, in a linear array, a plurality of driver transistors for selectively passing currents through the heaters, a shift register for coverting inputted printing data into parallel outputs, and a plurality of gate circuits for transferring the parallel outputs from the shift register to the base electrodes of the driver transistors only upon arrival of a head control pulse. The printing operation consists in imparting a predetermined pitch feed to heat-sensitive paper contacted by the thermal head, while causing the shift register to deliver printing data, and applying head control pulses with a duration time of usually 2–3 ms, to the gate circuits to thereby render conductive only those driver transistors which correspond to data bits at the "1" logic level in the printing data to pass currents through the corresponding heaters to heat the latter, thereby printing bar codes, numerals, letters or the like in color on the heat-sensitive paper.

Thus, if part of the printing circuit of the thermal printer becomes defective, the heat-sensitive paper contacted by the defective portion fails to develop color in some area or develops color continuously without regard to the printing data. That is, a heater break leads to a failure in color development, while a short in the driver transistors results in continuous color development. Further, if the shift register becomes defective, color development and printing as per the printing data cannot be effected. Such failure in normal color development or printing makes it difficult or impossible to read the printed numerals or letters. Particularly in the case of bar codes, even if the printing is partly defective, such defects cannot be detected visually. And when automatic reading is effected with a light pen, numerical values in some digit places would be read as completely different values.

Conventional approaches to these problems include one consisting in imparting to the register data in which all bits are at "1" or "0" logic levels so as to actually effect printing for visual inspection to see if the colored pattern printed on the heat-sensitive paper is all colored without bit skipping or if there is no color development at all. This approach, however, requires the operator to make a check each time the thermal printer is started, which complicates the operation and is uneconomical in that the actual printing for checking purposes involves waste of heat-sensitive paper and heat-sensitive labels.

Accordingly, the present invention is proposed to eliminate the drawbacks described above and to provide a device for automatically checking the printing, circuit without actual printing by making use of the waiting time in which the thermal printer is not printing.

To this end, the invention provides a device for checking the printing circuit of a thermal printer wherein pulse currents are passed through only those of the heaters which correspond to printing data stored in a shift register via a power supply resistor and driver transistors to energize the corresponding heaters so as to effect color printing for one operation on heat-sensitive paper, said device comprising a self-examination control section for effecting at least one of the three types of checking, i.e., a check on the driver transistors for malfunction, a check on the heaters for malfunction, and a check on the shift register for malfunction.

According to the invention, in a thermal printer, the heaters, driver transistors and shift register in the printing circuit can be automatically checked for malfunction in a period of time shorter than the time required for head control pulses for normal printing, with a predetermined timing during the non-printing time and hence without adverse influences such as delaying the printing time thus saving the time and labor required for manual operation and increasing the reliability of the thermal printer. Further, the invention avoids waste of heat sensitive paper and heat-sensitive labels. Further, since the heaters are caused to generate only a negligible amount of heat, there is no possibility of decreasing the heater life.

Figure 2:
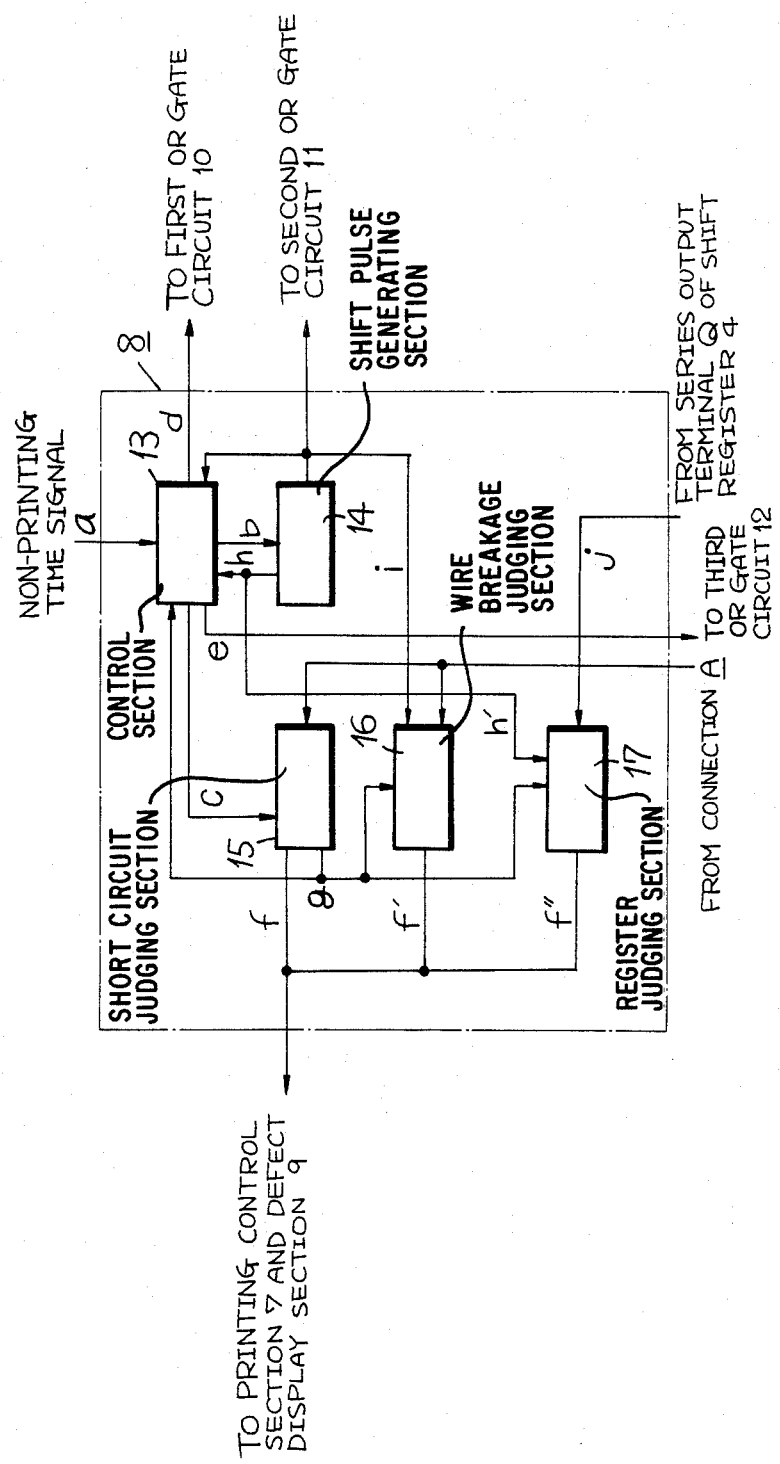

These and other objects and features of the invention will become more apparent from the following description to be given with reference to the accompanying drawings, in which:

FIG. 1 is a block diagram showing a device according to an embodiment of the present invention; and FIG. 2 is a block diagram of the self-examination control section of the device shown in FIG. 1.

In FIG. 1, the numeral 1 denotes a plurality of heaters arranged in a predetermined pattern on a thermal head; 2 denotes a power supply resistor connected to the heaters 1 at one of their respective ends; 3 denotes a plurality of driver transistors connected to the other ends of said heaters; 4 denotes a shift register for converting printing data into parallel outputs; 5 denotes a plurality of gate circuits for controlling the outputs from the shift register; 6 denotes current limiting resistors for applying the outputs from the shift register 4 to the base electrodes of the driver transistors; 7 denotes a printing control section for serially delivering printing data to the shift register and for delivering head control pulses to the gate circuits with a suitable timing; 8 denotes a self-examination control section for delivering checking data to the shift register 4 in accordance with a procedure to be later described, for delivering head control pulses with such a duration time as not to effect color development or printing, e.g., several μs, to the gate circuits 5 for a check on the potential at the connection A between power supply resistor 2 and the heaters 1 in order to judge whether or not the heaters 1 and driver transistors 3 are in good condition, and for detecting data from the series output terminal Q of the shift register 4 to see if the shift register 4 is operating properly. 9 denotes a defect indication display section for displaying a defect if the self-examination control section 8 has detected some defect; 10 denotes a first OR gate circuit for transferring the printing data or checking data from the printing control section 7 or self-examination control section 8 respectively, to the series input terminal S of the shift register 4; 11 denotes a second OR gate circuit for transferring the shift pulses from the printing control section 7 or self-examination control section 8, respectively to the shift pulse terminal CP of the shift register 4; and 12 denotes a third OR circuit for transferring the head control pulses from the printing control section 7 or self-examination control section 8, respectively to the gate circuits 5.

Referring to FIG. 2 showing the self-examination control section 8, the numeral 13 denotes a control section for issuing instructions to initiate a predetermined checking operation when the printing control section 7 delivers a non-printing time signal a; 14 denotes a shift pulse generating section for delivering shift pulses corresponding in number to the number of bits in the shift register 4 to the second OR gate circuit 11, etc., in response to a shift control signal b delivered from the control section 13 at the time of the checking operaton; 15 denotes a short-circuit judging section for judging whether or not there is a short in the driver transistors 3 when a judgment instruction signal c is delivered from the control section 13; 16 denotes a wire breakage judging section for judging whether or not there is a break in the heaters 1; and 17 denotes a register judging section for judging whether or not the shift register 4 is in good condition.

The functioning of the arrangement in this embodiment is as follows:

The normal printing operation is performed by the printing control section 7. That is, when a printing instruction signal P is transferred to the printing control section 7, the latter serially transfers printing data to the shift register 4 through the first OR gate circuit 10. The printing data is read into the shift register 4 with the timing for the shift pulses transferred to the shift pulse terminal CP of the shift register 4 from the printing control section 7 via the second OR gate circuit 11. Then, the shift register 4 arranges the data in parallel and delivers the same to the gate circuit 5 through its parallel output terminals. Subsequently, the printing control section 7 delivers head control pulses with a duration time of, e.g., 2–3 ms to the control terminals of the gate circuits 5 through the third OR gate circuit 12. As a result, only those of the driver transistors 3 which correspond to the bits for those of the parallel outputs from the shift register 4 which were at a "1" logic level are rendered conductive for the duration of the head control pulses, thus applying heating current to only the corresponding heaters 1 via the power supply resistor 2, so that a pattern of characters is color-printed on the heat-sensitive paper contacted therewith. Thereafter, the heat-sensitive paper is fed with a predetermined pitch, and the printing control section 7 controls the next line of printing data to effect the next printing operation. In this manner, successive lines of print are made on the-heat-sensitive paper.

A check on the printing circuit may be made at any desired time during the non-printing interval. For example, it can be made during each non-printing interval by making use of the interval between two successive printing operations. That is, upon completion of one printing operaton, the printing control section 7 delivers a non-printing time signal a to the self-examination control section 8. When the latter receives this non-printing time signal a at its control section 13, checks on the driver transistors 3, heaters 1 and shift register 4 are made to see if they are in good condition, in accordance with the following procedures: First, with the data output d of the control section 13 maintained at a "0" logic level, a shift pulse control signal b is fed to the shift pulse generating section 14 to cause the latter to deliver a series of shift pulses, corresponding to the number of data bits in the shift register 4, into the shift pulse terminal CP of the shift register 4 via the second OR gate circuit 11. Then, the outputs from the parallel output terminals of the shift register are all brought to the "0" logic state, and the shift pulse generating section 14 delivers a shift pulse generation completed signal h to the control section 13. Then, the control section 13 feeds head control pulses e, with such a short duration time as not to effect color development and printing, to the gate circuits 5 via the third OR gate circuit 12, rendering all the gate circuits 5 conductive, while it also feeds a judgment instruction signal c. Thus, since the parallel outputs from the shift register 4 at this instant are all at "0" logic levels, the base electrodes of the driver transistors 3 are maintained on the at a "0" logic level, so that if the driver transistors 3 are in good condition, they will be in a cut-off state. Thus, no current will flow through the heaters 1 and the potential at the connection A between the power supply resistor 2 and the heaters 1 will be high. However, if even one of the driver transistors 3 is shorted, a current will flow through a heater 1 via such shorted driver transistor, even if the outputs from the gate curcuits 5 are all at "0" logic levels. As a result, the potential at the connection A between the power supply resistor 2 and the heaters 1 will be low. On this principle, the short-circuit judging section 15 in the self-examination section 8 judges the level of the potential at said connection A. If the potential at the connection A is low, the short-circuit judging section 15 judges that at least one driver transistor 3 is defective, feeding a defect signal f to the defect display section 9 and to the printing control section 7 for indication of a defect condition, while inhibiting the next printing operation. If the potential at the connection A is high, the short-circuit judging section 15 judges that the driver transistors 3 are in good condition, delivering the next judgment instruction signal g to the control section 13, wire breakage judging section 16 and register judging section 17.

Then, the control section 13 initiates a checking operation on the heaters 1 and shift register 4. First, the control section 13 causes the checking data signal d to go to a "1" logic level and delivers the checking data to the series input terminal S of the shift register 4 via the first OR gate circuit 10. A shift pulse control signal b is fed to the shift pulse generating section 14 to cause the latter to pass a single shift pulse to the shift pulse terminal CP of the shift register 4 through the second OR gate circuit 11. Thereupon, only that one of the parallel output terminals of the shift register 4 which is associated with the least significant bit delivers a "1" logic level signal, while the other parallel output terminals all deliver "0" logic level signals. At precisely this instant, the control circuit 13 delivers head control pulses e, with such a short duration time as not to effect color development and printing, to the gate circuits 5 through the third OR gate circuit 12. Then, only that one of the driver transistors 3 which corresponds to the least significant bit is rendered conductive. If the corresponding heater 1 is not broken, a current will flow from the power supply resistor into that heater 1, thus lowering the potential at the connection A. On the other hand, if it is broken, no current will flow through that heater 1, so that the potential at said connection A will be maintained high. On this principle, the wire breakage judging section 16 judges the level of the potential at the connection A in accordance with the timing of a shift pulse i applied to second OR gate circuit 11. If the potential at the connection A is high, the wire breakage judging section 16 judges that the heater 1 is broken, feeding a defect signal f' to the defect displaying section 9 and printing section 7 so as to give an indication of a defect condition and inhibit the next printing operation. Thereafter, with the checking data from the control section 13 caused to go to a "0" logic level, the shift pulse generating section 14 is caused to successively generate shift pulses i and shift the bit presenting a "1" logic level in the parallel output terminals of the shift register 4, successively to higher digit positions, while the wire breakage judging section 16 is caused to judge whether or not each heater 1 is normal, by the level of the potential at the connection A in the same procedure as described above in accordance with the timing of the generation of shift pulses i.

When the shift operations corresponding to the number of bits in the shift register are completed, the shift pulse generating section 14 delivers a shift pulse generation completed signal h' to the register judging section 17 and the latter judges whether or not the register 4 is in good condition. Thus, if the register 4 is in good condition, the "1" logic level data bit first transferred to the series input terminal S must have been delivered from the series output terminal Q by the time all shift operations have been completed. Accordingly, the judging section 17 is caused to judge this output j, and only when it is at a "0" logic level, will a defect signal f'' ' be delivered to the defect display section 9 and printing section 7 so as to give an indication of a defect condition and to inhibit the next printing operation.

Such a check on the printing circuit is made each time a non-printing time signal a is delivered from the printing control section 7. If, therefore, the self-examination control section has not delivered defect signals f, f', f'', the printing control section 7 will continue the normal printing operation. Since the checking operation described above requires a much shorter time than the usual conduction time of 2-3 ms required for the gate circuits 5, checking can be performed during the waiting time in the normal printing operation, without any adverse influence of lowering the printing speed. While the checking operation described above has been performed during a portion of the non-printing time immediately after completion of one printing operation, it may be performed at any time provided it is during the non-printing time. For example, it may be performed at regular time intervals or it may be performed only once during the non-printing time after the power to the thermal printer is turned on.

In the foregoing embodiment the heaters 1 have been checked for breakage subsequent to the check on the driver transistors 3 for malfunction, but this order may, of course, be reversed. Further, in making a check on the printing circuit according to the invention, it is not absolutely necessary to make all the described types of checks, i.e., a check on the driver transistors 3 for short-circuit, a check on the heaters 1 for breakage, and a check on the shift register 4 for malfunction, but at least one of these checks may be made.

If a check on the printing circuit according to the invention indicates the presence of a defect, the defective part will be replaced or repaired. In this case, since the heaters 1, driver transistors 3, and shift register 4 are usually constructed in separate blocks, or two or all of them are constructed in blocks, replacement of defective parts will be made block by block. Since some or all of the various parts are constructed in blocks in this manner, it is not necessary for a check according to the invention to go so far as to specify which component in a block is the defective part. However, in a printer where the heaters, driver transistors and register are constructed in separate blocks, it is preferably to arrange the defect display section 9 so that it will differentially indicate in which block a defect is present in association with respective defect signals f, f', f''.

As it will be apparent widely different embodiments of this invention may be made without departing from the spirit and scope thereof, it is to be understood that the invention is not limited to the specific embodiment thereof except as defined in the appended claims.

What is claimed is:

1. A device for checking the printing circuit of a thermal printer which includes a plurality of heaters arranged in a predetermined pattern on a thermal print head for printing print data; a power supply resistor connected between one end of said heaters and a source of current for supplying heating current to said heaters; a plurality of driver transistors each in operable connection with another end of said heaters and a ground, for selectively conducting heating current through said heaters; a shift register for providing parallel print data output signals to be printed by said thermal print head as said print data; and a plurality of logic gate circuits each in operable connection with individual parallel data output terminals of said shift register and, through current limiting resistors, with the base of one of said plurality of driver transistors for selectively transferring said print data output signals to be printed from said shift register to the bases of said plurality of driver transistors in accordance with head control pulse signals applied to said logic gate circuits in order to selectively cause said driver transistors to conduct heating current through said heaters to print said print data on thermal paper in contact with said heaters; said device comprising:

printing control circuit means for applying serial print data input signals corresponding to said print data to be printed to a serial data input terminal of said shift register and for applying said head control pulse signals to said plurality of logic gate circuits, said serial print data input signals and said head control pulse signals being applied, respectively, at suitable times for causing said print data to be normally printed;

self-examination control circuit means for applying serial checking data signals to said serial data input terminal of said shift register and for applying head control pulse signals to said plurality of logic gate circuits so as to check the level of a potential at a circuit connection point between said power supply resistor and said heaters so as to judge whether or not said heaters and said driver transistors are in good condition, said head control pulse signals having such a short pulse duration time as not to effect color development or printing, while detecting serial output data signals from a serial data output terminal of said shift register so as to judge whether said shift register is in good operating condition;

defect display circuit means for indicating a defect condition detected by said self-examination control circuit means;

first OR gate logic circuit means in operable connection with said printing control circuit means, said self-examination control circuit means and said serial data input terminal of said shift register for transferring said serial print data input signals from said printing control circuit means or said checking data signals from said self-examination control circuit means to said serial data input terminal of said shift register;

second OR gate logic circuit means in operable connection with said printing control circuit means, said self-examination control circuit means and said shift register for transferring shift pulse signals from said printing control circuit means of said self-examination control circuit means to a shift pulse terminal of said shift register; and third OR gate logic circuit means in operable connection with said printing control circuit means, said self-examination control circuit means and said plurality of logic gate circuits for transferring head control pulse signals from said printing control circuit means or said self-examination control circuit means to said plurality of logic gate circuits.

2. A device for checking the printing circuit of a thermal printer as claimed in claim 1 wherein said self-examination control circuit means is operable during non-printing intervals of said thermal printer, in accordance with non-printing status signals applied thereto from said printing control circuit means.

3. A device for checking the printing circuit of a thermal printer as claimed in claim 2 wherein said self-examination control circuit means comprises a control section in operable connection with said printing control circuit means and said first OR gate logic circuit means for commanding a predetermined checking sequence whenever said non-printing status signals are applied thereto from said printing control circuit means; a shift pulse generating section in operable connection with said control section for applying shift pulse signals, corresponding in number to a number of data bits stored in said shift register, to said second OR gate logic-circuit means in response to a shift pulse control signal applied to said shift pulse generating section from said control section; a short-circuit judging section in operable connection with said control section, said printing control circuit means and said circuit connection point between said power supply resistor and said plurality of heaters for checking the level of said potential at said circuit connection point for determining the presence or absence of a short-circuit in said driver transistors; a wire-breakage judging section in operable connection with said control section, said shift pulse generating section and said circuit connection point between said power supply resistor and said plurality of heaters for determining the presence or absence of a break in said heaters and a register judging section in operable connection with said control section, said shift pulse generating section and said serial data output terminal of said shift register for determining whether or not said shift register is in good operating condition.

4. A device for checking the printing circuit of a thermal printer in accordance with claim 2 wherein said control section is operable to cause said self-examination control circuit means to perform said checking during a non-printing interval of said thermal printer after the completion of one normal printing operation.

5. A device for checking the printing circuit of a thermal printer in accordance with claim 2 wherein said control section is operable to cause said self-examination control circuit means to perform said checking only once upon application of power to said thermal printer.

6. A device for checking the printing circuit of a thermal printer in accordance with claim 2 wherein said self-examination control circuit means is operable to perform at least one checking operation of the group of checking operations consisting of a check on said plurality of driver transistors for a short-circuit defect condition, a check on said plurality of heaters for a breakage defect condition and a check on said shift register for a malfunction defect condition.

7. A device for checking the printing circuit of a thermal printer in accordance with claim 2 wherein at least one of the group consisting of said plurality of heaters, said plurality of driver transistors and said shift register are constructed as separate modular units.

8. A device for checking the printing circuit of a thermal printer as set forth in claim 1 wherein said plurality of heaters, said plurality of driver transistors and said shift register are each constructed as separate modular units and said defect display circuit means is operable to indicate in which of said modular units a defect condition detected by said self-examination control circuit means exists.

* * * * *